United States Patent [19]

Andersson et al.

[11] Patent Number: 5,155,799
[45] Date of Patent: Oct. 13, 1992

[54] HEATING APPARATUS FOR PACKAGING MATERIALS UTILIZING HEATED AIR RECIRCULATION

[75] Inventors: Roland Andersson, Malmö; Lars Svensson, Lund, both of Sweden

[73] Assignee: Tetra Alfa Holdings S.A., Pully, Switzerland

[21] Appl. No.: 606,458

[22] Filed: Oct. 31, 1990

[30] Foreign Application Priority Data

Nov. 27, 1989 [SE] Sweden ............... 89039986

[51] Int. Cl.[5] .................. B65B 51/20; B65B 53/06
[52] U.S. Cl. .................. 392/473; 392/379; 392/382; 53/557; 53/370.7; 156/497
[58] Field of Search .......... 392/473, 379, 381–382; 53/557, 477, 375, 379, 373, 370.7, 370.8, 370.9, 371.8; 34/132, 100, 212–221; 156/497; 219/388, 400

[56] References Cited

U.S. PATENT DOCUMENTS

| | | | |
|---|---|---|---|
| 2,906,627 | 9/1959 | Payton et al. | 53/577 |
| 3,222,800 | 12/1965 | Siegel et al. | 34/212 |
| 3,257,769 | 6/1966 | Ford | 392/379 |
| 3,357,153 | 12/1967 | Shaffer | 53/557 |
| 3,621,588 | 11/1971 | Grocke | 53/557 |
| 3,673,703 | 7/1972 | Wieligmann | 53/557 |
| 3,727,324 | 4/1973 | Melgaard | 53/557 |
| 3,744,146 | 7/1973 | Nichols | 53/557 |
| 3,777,446 | 12/1973 | Graver | 219/388 |
| 3,807,126 | 4/1974 | Schwarz | 53/557 |
| 3,811,201 | 5/1974 | Endter et al. | 34/221 |
| 3,826,017 | 7/1974 | Kostur | 53/557 |
| 3,980,515 | 9/1976 | Reil et al. | 156/218 |
| 4,204,379 | 5/1980 | Mugnai et al. | 53/557 |
| 4,273,981 | 6/1981 | Nopper | 219/400 |
| 4,497,999 | 2/1985 | Postbeschild | 34/98 |
| 4,511,426 | 4/1985 | Linner | . |
| 4,597,247 | 7/1986 | Johnson | 53/557 |

FOREIGN PATENT DOCUMENTS 1069349  3/1967  United Kingdom .

OTHER PUBLICATIONS

IBM Technical Disclosure Bulletin, vol. 8, No. 12, May 1966 (J. Young).

Primary Examiner—Bruce A. Reynolds
Assistant Examiner—J. Jeffery
Attorney, Agent, or Firm—Burns, Doane, Swecker & Mathis

[57] ABSTRACT

A heating apparatus for heating thermoplastic packaging materials to allow the materials to be heat-sealed, formed, or reformed includes two nozzles which supply heated air to the packaging materials, a suction box which sucks the heated air away from the packaging materials after the air has heated the materials, and a recirculation duct which recirculates the heated air from the suction box back to an intake of the nozzles.

4 Claims, 2 Drawing Sheets

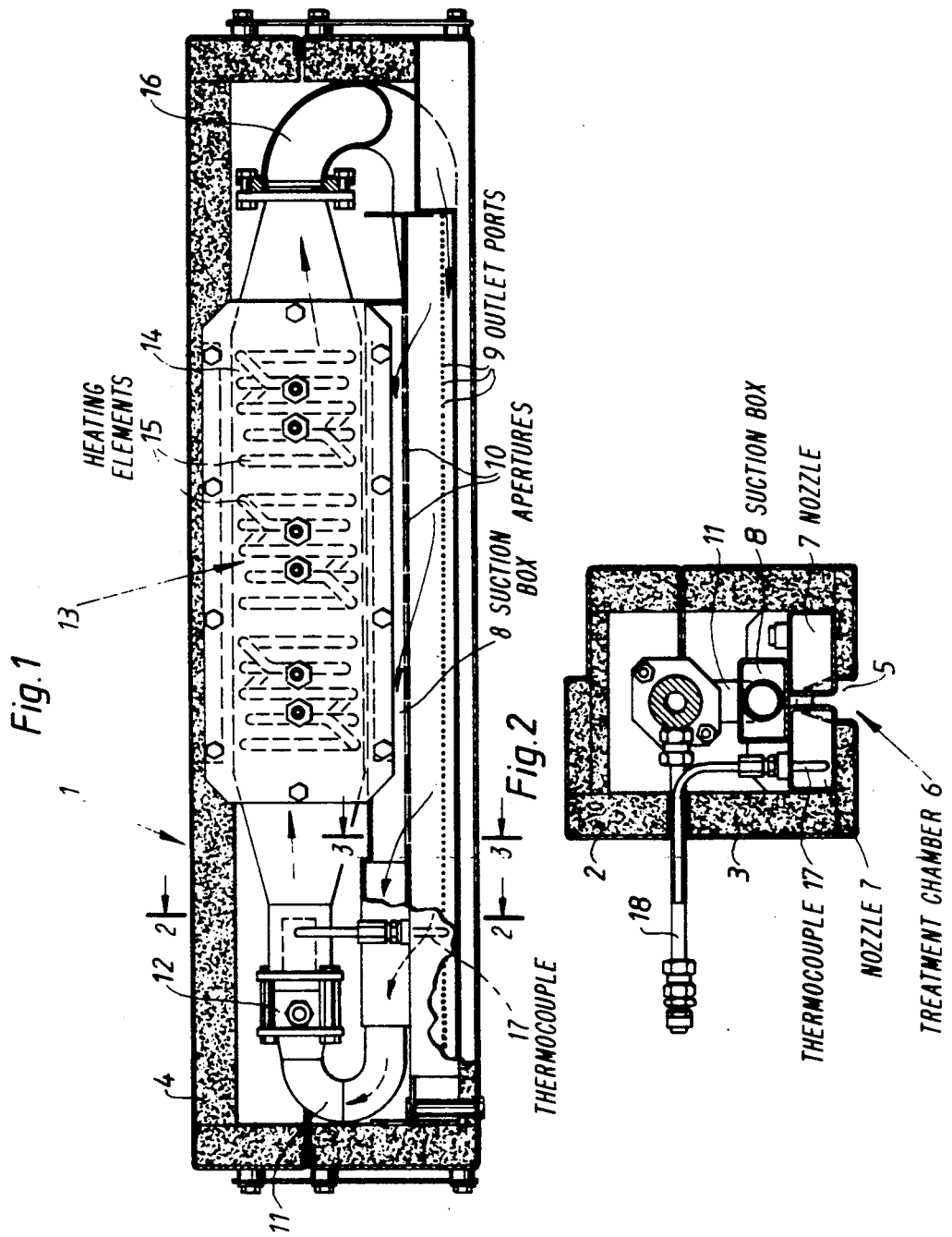

HEATING APPARATUS FOR PACKAGING MATERIALS UTILIZING HEATED AIR RECIRCULATION

BACKGROUND OF THE INVENTION

1. Field of the Invention

The present invention relates to heating apparatuses and more particularly to heating apparatuses for heating packaging materials.

2. Description of the Prior Art

Packages or cartons of the single-use disposable type which hold liquid contents such as milk, juice or the like are often manufactured by reforming and sealing laminated packaging material. The packaging material consists wholly or partly of thermoplastic material which, during the reforming process into cartons, is heated to its softening or melting temperature point in order to make reforming and/or sealing of the material possible. One generally employed working operation is to heat the edge regions of a material web until the outer thermoplastic layer of the packaging laminate melts, whereafter the edge regions are compressed together and allowed to cool so that a liquid-tight seal is created.

The prior art heating apparatuses employed for carrying out the above-mentioned heating operation are of varying types, but operate remarkably often with hot air which is led to those surfaces of the material which are to be heated. Hot air heating is preferred in many cases, since a large number of prior art heating apparatuses are available on the market at a relatively reasonable cost, and such apparatuses share the common feature that hot air heating makes it possible to restrict the heating to a defined, optionally shaped region at the same time as the heating level may readily be regulated. Such heating apparatuses normally include an air nozzle which is aimed towards that region of the packaging material which is to be heated. Air is supplied to the nozzle by means of a fan that sucks in ambient air which, before reaching the nozzle, passes a heating device, normally some form of electric resistor element, so that the air, on departing from the nozzle, is at a desired temperature, generally between 200° and 400° C.

The disadvantages inherent in prior art heating apparatuses of the hot air type are primarily that they are extremely energy-intensive, since the heated air, after having come into contact with the packaging material and having given off but a minor fraction of its heat, flows out into the ambient atmosphere. This is not only a disadvantage from the energy viewpoint, but also entails an unnecessary and, in many cases, hazardous warming of the atmosphere. Another disadvantage which contributes to poor heat economy is the sluggishness of response shown by heating apparatuses of the resistor type to adjustment. In order to ensure that a sufficient volume of air at the desired temperature is available on those occasions when packaging materials are to be heated, the heating device proper normally operates continously and the generated hot air is channelled off into the atmosphere so that it does not impinge on the packaging material when this is not desirable, for instance between heating of successively advanced, sheet-formed packaging material blanks.

Thus, the low degree of efficiency of the prior art constructions is not only wasteful of energy, but also constitutes a hazardous warming of the atmosphere and it is, therefore, a general desire within this art to devise a heating apparatus of the hot air type which does not suffer from the above-mentioned drawbacks.

OBJECTS OF THE INVENTION

One object of the present invention is to devise a heating apparatus for packaging material, wherein the heating apparatus works with hot air and thereby utilizes the advantages afforded by hot air with regard to rapid and concentrated heating, while its obviates the disadvantages inherent therein, principally the low degree of efficiency.

A further object of the present invention is to devise a heating apparatus in which the wastage of hot air into the atmosphere is greatly reduced in comparison with prior art constructions.

Yet a further object of the present invention is to devise a heating apparatus of the hot air type which not only reduces the leakage of hot air into the atmosphere but also restricts total thermal emissions, so that a high degree of efficiency is achieved.

Still a further object of the present invention is to devise a heating apparatus of the hot air type which is of simple and reliable design and construction and which may be designed as a compact insulated unit.

Finally, yet a further object of the present invention is to devise a heating apparatus of the hot air type which is eminently suited for heating edge regions of thermoplastic-coated packaging materials.

SUMMARY OF THE INVENTION

The above objects as well as other objects not specifically enumerated are accomplished by a heating apparatus according to the present invention. The heating apparatus for heating packaging materials according to the present invention includes an air intake device including means for generating an air current, a heating device located downstream of the air intake device for heating the air in the air current, a nozzle located downstream of the heating element for supplying the heated air to the packaging materials to thereby heat the packaging materials, a suction box located adjacent the nozzle for sucking the heated air away from the packaging materials after the packaging materials have been heated, and a recirculation duct connected between the suction box and the air intake device to recirculate the heated air back through the apparatus.

BRIEF DESCRIPTION OF THE DRAWING

A preferred embodiment of the present invention will now be described in greater detail with particular reference to the accompanying schematic drawing wherein like elements bear like reference numerals, and wherein:

FIG. 1 is a partially sectional elevational view of an apparatus according to the present invention, FIG. 2 is a cross sectional view of the apparatus along the line 2—2 in FIG. 1.

DETAILED DESCRIPTION

Figure 3:
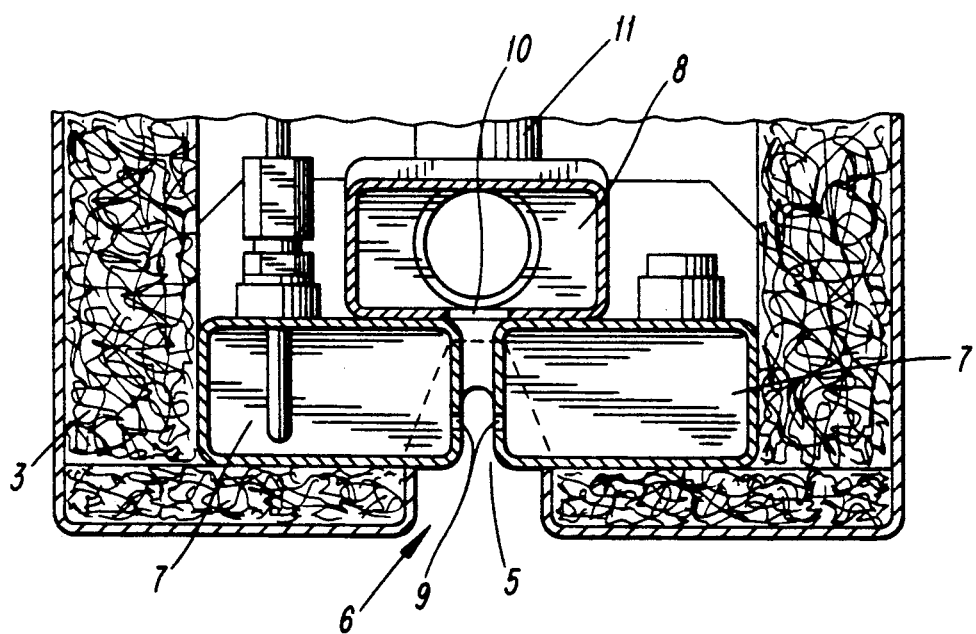
FIG. 3 is an enlarged partial cross-sectional view of FIG. 1 through the lines 3—3.

A heating apparatus according to the present invention is intended to be placed in a packaging machine for the manufacture of packages or cartons from a packaging laminate wherein the packaging laminate includes outer layers of thermoplastic material which are utilised for realising a liquid-tight seal of a carton. The apparatus is intended to heat an edge region of the packaging material to the softening temperature of the thermoplastic layer prior to sealing. If necessary, the apparatus may of course also be employed separately, for example in the prefabrication of sleeve-shaped package blanks, or in the reforming of a packaging material web into hose or tube form by joint sealing of both of the longitudinal edges thereof.

The preferred embodiment of the heating apparatus illustrated in FIGS. 1 and 2, is of compact design and is enclosed in a casing 1 which is of substantially rectangular configuration. The apparatus also includes a lid 2 and a bottom portion 3. Both the lid 2 and the bottom portion 3 consists of walls with an inner insulation 4. The bottom wall of the bottom portion 3 displays a centrally disposed longitudinal channel 5 for the packaging material and has corresponding recesses in the end walls. Via the channel 5, the packaging material (not shown) reaches up into a treatment chamber 6 which is laterally defined by two identical mutually facing nozzles 7 and a suction box 8 disposed above the nozzles. These parts together define the treatment chamber 6 so that it is only open downwardly. Both of the nozzles 7 have mutually facing rows of outflow ports 9, by which hot air may flow out and realize a substantially linear heating of packaging material (not shown) located in the treatment chamber 6. The upper defining wall of the treatment chamber 6 formed by the suction box 8 includes a number of apertures 10 in the form of holes of varying diameter. To ensure a uniform air flow, the hole located furthest to the right in FIG. 1 is of the largest diameter, while the size of the holes progressively diminishes in a direction to the left, i.e. in the direction of flow of the air (see arrows). At its left-hand end, the suction box 8 connects to a recirculation duct 11 which, via a return bend, leads to air current generating means in the form of an ejector 12. The opposite end of the ejector 12 is connected to a heating device 13 which includes a cassette 14 with a number of electric resistor elements 15 of a per se known type. At the opposite end of the cassette 14 in relation to the ejector 12, there is disposed an air duct 16 which, via a return bend, leads the air to the two nozzles 7 located in parallel.

At the end of the one nozzle 7 (seen in the direction of flow), there is disposed a thermocouple 17 which is electrically connected to a conventional control unit (not shown) which regulates the current supply to the resistor elements 15. The ejector 12 is connected, via pipe 18, to a compressed air source (not shown) from which compressed air for driving the ejector may be obtained. The compressed air source should be of such capacity that the ejector can be fed with compressed air at a pressure of between 0.6 and 0.8 bar at a flow rate of 50–100 liters/min. In such an instance, the ejector (which is of conventional type) gives an air flow rate of 200–300 liters/min.

When the apparatus according to the present invention is made operational, the pipe 18 of the ejector 12 is placed in communication with the compressed air source, and the ejector sucks air via the apertures 10 of the suction box 8 so that an air flow into the cassette 14 of the heating device 13 is created. The resistor elements 15 are connected to a power source which makes it possible to heat up the passing air to a temperature of between 300° and 500° C. The thus heated air is fed, via the bent air duct 16, to a branch pipe which distributes the air to the two parallel nozzles 7.

The air flows out through the linearly disposed ports 9 of the nozzles at high speed in a direction towards the edge of the packaging material which is to be heated (not shown) located in the treatment chamber 6. When the air reaches the surface of the packaging material, it is led off, but thanks to the suction box 8 located directly above the two nozzles 7, this air is immediately taken care of and sucked into the suction box in order once again to reach the ejector 12 via the recirculation duct 11 and be recirculated (clockwise in FIG. 1) via the heating device 13 to the two nozzles 7. The requisite heating of the air is governed by the thermocouple 17, which senses the temperature of the air and ensures that the elements 15 are regulated so that the desired temperature increase is achieved as air flows past the elements 15. The use of the recirculated air which, after passage through the suction box, is still at a high temperature (approximately 200°–300° C.) is made possible thanks to the utilisation of an ejector as the means generating an air current instead of, for instance, an electric fan which would not withstand the high prevailing temperatures. The design of the apertures 10 of the suction box with progressively diminishing diameters seen in the direction of flow has proved to make it possible to achieve a relatively uniform extraction of the return air throughout the entire length of the nozzles 7, which is a guarantee of uniform heating of the packaging material. The compressed air to the ejector 12 may possibly be preheated by leading the pipe 18 through a longer or shorter distance within the casing 1.

In practical operation of the apparatus according to the present invention, it has proved possible to reduce energy requirements most dramatically on heating of a longitudinal edge of a packaging material, at the same time as working environment conditions are greatly enhanced as a result of the reduction in thermal emissions from the apparatus.

While this invention has been illustrated and described in accordance with a preferred embodiment, it is recognized that variations and changes may be made therein without departing from the invention as set forth in the claims.

What is claimed is:

1. Heating apparatus for heating packaging materials, comprising:
    an elongated nozzle having a plurality of outlet ports spaced longitudinally of the nozzle and an inlet opening adjacent one end of the nozzle;
    an elongated suction box adjacent said nozzle and having a plurality of apertures communicating with the nozzle;
    air duct means for conducting a current of air from said suction box to said nozzle inlet;
    heater means in said air duct means for heating the air flowing through the air duct means, said heater means including electric resistor elements disposed in a cassette in said air duct means;
    circulation means for accelerating the rate of flow of air through the air duct means; and,
    said cassette, said circulation means, said nozzle and said suction box each being connected to each other so as to enable the circulation of a fluid flow generated by said circulation means; said cassette, said circulation means, said nozzle and said suction box being enclosed in a frame means having thermally insulating walls.

2. The apparatus according to claim 1, wherein said suction box extends in a direction parallel to said nozzle.

3. The apparatus according to claim 1, wherein said circulation means includes an ejector connected to a compressed air source.

4. The apparatus according to claim 3, further including a thermocouple for controlling said heating device, said thermocouple being located upstream of said ejector.

* * * * *